(No Model.)
L. PAINCHAUD.
LOOM TEMPLE.
No. 598,808. Patented Feb. 8, 1898.
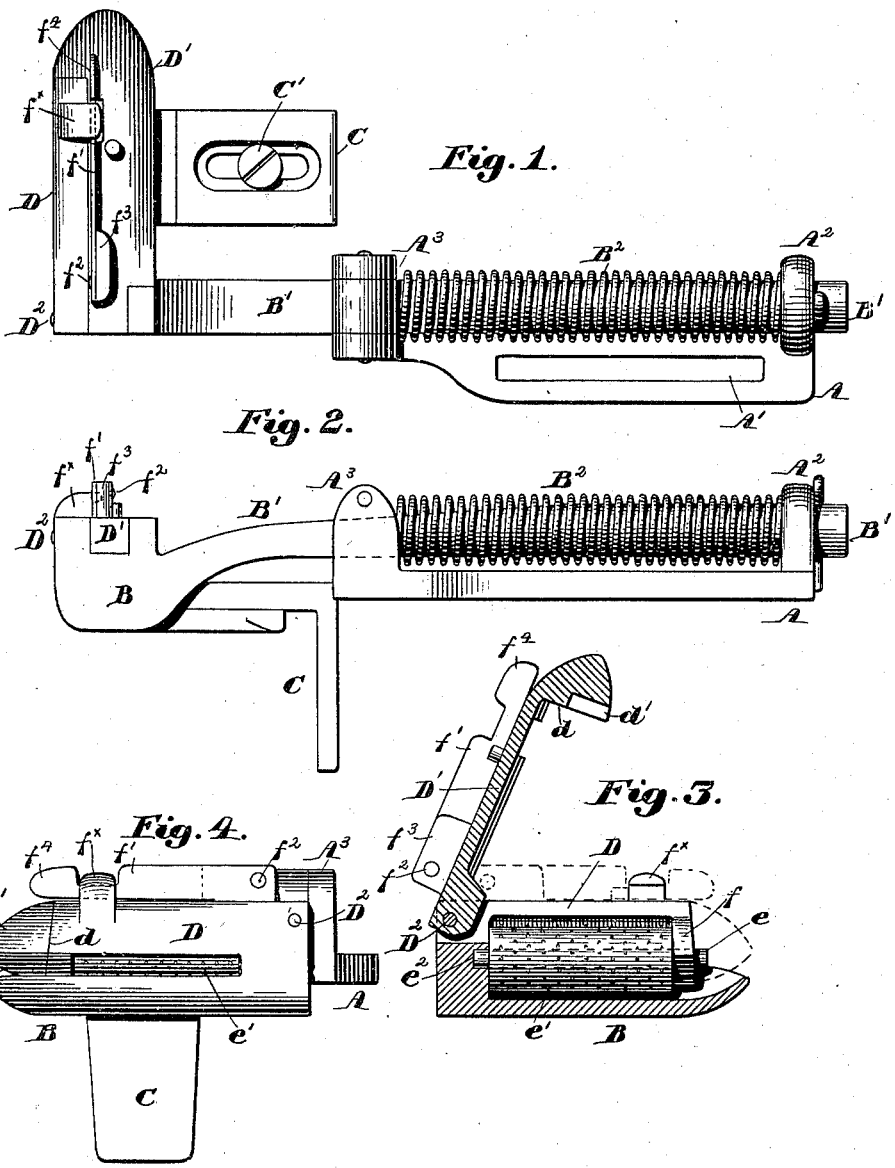
Witnesses:
Walter P. Lombard
Thomas J. Drummond
Inventor:
Ludger Painchaud,
by Crosby & Gregory
Attys.

UNITED STATES PATENT OFFICE.

LUDGER PAINCHAUD, OF SALEM, MASSACHUSETTS, ASSIGNOR TO THE DRAPER COMPANY, OF PORTLAND, MAINE, AND HOPEDALE, MASSACHUSETTS.

LOOM-TEMPLE.

SPECIFICATION forming part of Letters Patent No. 598,808, dated February 8, 1898.

Application filed June 5, 1897. Serial No. 639,511. (No model.)

*To all whom it may concern:*

Be it known that I, LUDGER PAINCHAUD, of Salem, county of Essex, State of Massachusetts, have invented an Improvement in Loom-Temples, of which the following description, in connection with the accompanying drawings, is a specification, like letters on the drawings representing like parts.

This invention has for its object the production of an improved loom-temple, my invention relating more especially to the head of the temple or the part between which the roller turns.

In temples as now commonly made the pod or part under the roller is integral with the temple-bar and the cap is made as a separate detachable piece, and to uncover the roller the cap must be removed.

In this my present invention I have divided the cap, a part of it at the immediate inner end of the temple or the end nearest the reed being integral with the pod, the other part of the cap being pivotally mounted above the roller, so that it may be lifted whenever it is desired to uncover the roll, the pivoted part of the cap having at its free end a downturned ear, which is shaped to coöperate with the end of the stud or spindle for the temple-roll outside the outer bearing for said stud, the stationary part of the cap having a right-angled extension or bearing-lug which not only receives one end of said stud or spindle, but which also acts to prevent too much endwise movement of the temple-roll on its stud or spindle.

As I have herein shown my invention, the cap is made in two parts, one part having a suitable spring and the other a projection to constitute a locking device to retain the cap in working position.

Figure 1, in a top plan view, represents a temple embodying my invention; Fig. 2, a side elevation thereof; Fig. 3, a sectional detail longitudinally of the pod and cap, with the movable part of the cap elevated; and Fig. 4 is a front end view of the temple in working position.

The stand A, having a slot A', in which to place the usual screws for confining the stand in place on the breast-beam, the said stand having guides $A^2$ $A^3$, and the shank B', having the pod B, and the spring $B^2$, surrounding the shank between the lugs $A^3$ and $A^2$, and the heel-plate C, attached to an extension of the pod by a suitable screw C', are and may be all as usual.

In accordance with my invention the cap is composed of a stationary portion D, which may be and is shown as integral with the pod, and a movable portion D', the movable portion being mounted upon a pin $D^2$. (See Figs. 1, 3, and 4.)

The movable portion of the cap has at its outer end a depending ear $d$, which is slotted at $d'$, (see Fig. 3,) said slot when the cap is closed, as in Fig. 1, fitting over the end $e$ of the pin, on which turns the usual temple-roll $e'$, said pin being longitudinally movable in a right-angled extension or bearing-lug $f$ of the stationary part D of the cap, the inner end $e^2$ of said pin entering loosely a hole in a portion of the pod. (See Fig. 3.)

When the cap part D' is elevated, as in Fig. 3, the operator may, with pincers or otherwise, grab the end $e$ of the pin and withdraw it to the right, viewing Fig. 3, thus removing the roll $e'$, if desired.

Raising the portion D of the cap exposes the roll for any desired purpose.

The stationary part D of the cap, as herein shown, has a lug $f^\times$, under which passes a spring $f'$, shown as attached by a suitable rivet $f^2$ to a lug $f^3$, rising from the top of the movable part D' of the cap, said spring when in engagement with said projection $f^\times$ serving to lock and retain the movable part of the cap in operative position; but the operator may, by pressing upon the end $f^4$ of the spring, disengage it from the said projection $f^\times$, thereby leaving the movable part D' of the cap free to be elevated, as represented in Fig. 3.

Having described my invention, what I claim as new, and desire to secure by Letters Patent, is—

1. In a loom-temple, a temple-roll, a pod, a stationary cap portion located above said pod, and a stud mounted in said stationary portion, combined with a pivoted movable cap portion arranged parallel to the said stationary cap portion, said pivoted cap portion being adapted to be turned up away from the stationary cap portion, to thereby uncover the temple-roll that it may be removed, substantially as described.

2. In a loom-temple, a shank having a connected pod, a two-part cap portion, one of said cap portions being stationary and provided with a right-angled extension or bearing-lug, the other part of said cap being pivoted with relation to the pod and provided with a downturned ear, said movable cap portion being arranged parallel with the said stationary cap portion, the ear of the pivoted cap portion overlapping the bearing-lug of the stationary cap portion, combined with a temple-roll, and a stud or spindle mounted on said stationary cap portion, substantially as described.

3. In a loom-temple, a pod, a stationary cap portion, having a lug to receive and hold the pin on which turns the temple-roll, combined with a pivoted cap portion having an ear provided with a groove to embrace and lap over one end of the pin on which the roll turns, said movable cap portion retaining the said pin in place while the temple is in operative position, substantially as described.

In testimony whereof I have signed my name to this specification in the presence of two subscribing witnesses.

LUDGER PAINCHAUD.

Witnesses:
MARY E. MOONEY,
HURMEL TREMBLEY.